US008688867B2

(12) United States Patent
Prall

(10) Patent No.: US 8,688,867 B2
(45) Date of Patent: Apr. 1, 2014

(54) SYSTEM AND METHODS FOR COMMUNICATING BETWEEN SERIAL COMMUNICATIONS PROTOCOL ENABLED DEVICES

(75) Inventor: John Michael Prall, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1245 days.

(21) Appl. No.: 12/030,361

(22) Filed: Feb. 13, 2008

(65) Prior Publication Data

US 2009/0204665 A1    Aug. 13, 2009

(51) Int. Cl.
*G06F 3/00* (2006.01)
(52) U.S. Cl.
USPC ............................................. 710/20; 717/168
(58) Field of Classification Search
USPC ......................................................... 710/20
See application file for complete search history.

(56) References Cited

U.S. PATENT DOCUMENTS

| | | | | |
|---|---|---|---|---|
| 6,880,037 | B2 * | 4/2005 | Boyer | 711/103 |
| 2002/0144027 | A1 * | 10/2002 | Schmisseur | 710/22 |
| 2005/0223163 | A1 * | 10/2005 | Ogasawara et al. | 711/112 |
| 2007/0027937 | A1 * | 2/2007 | McGrattan et al. | 707/204 |
| 2007/0118709 | A1 * | 5/2007 | Tysowski et al. | 711/165 |
| 2009/0204665 | A1 * | 8/2009 | Prall | 709/203 |

* cited by examiner

*Primary Examiner* — Elias Mamo
(74) *Attorney, Agent, or Firm* — Jetter & Associates, P.A.

(57) ABSTRACT

A method and system (200) for communicating between a first and second serial communications protocol (SCP) enabled device (202, . . . , 212, 224). The method includes the step of comparing a data block comprising a plurality of data values from the first SCP enabled device to a plurality of reference data values. The method also includes the step of determining which of the data values has changed and which of the data values has not changed. This determination is made based on the comparing step. The method further involves writing substantially only the data values that have changed to a memory of the second SCP enabled device.

14 Claims, 10 Drawing Sheets

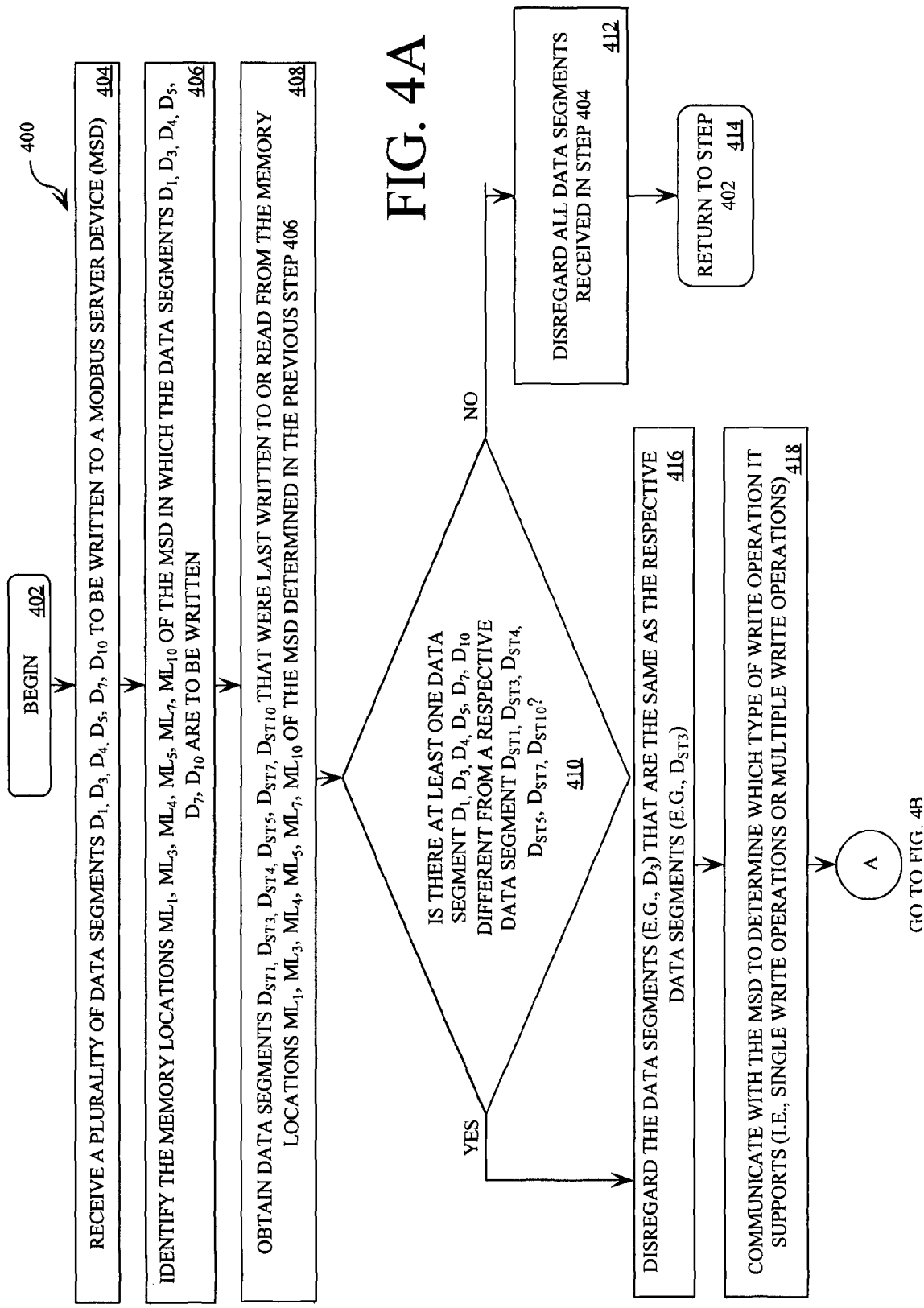

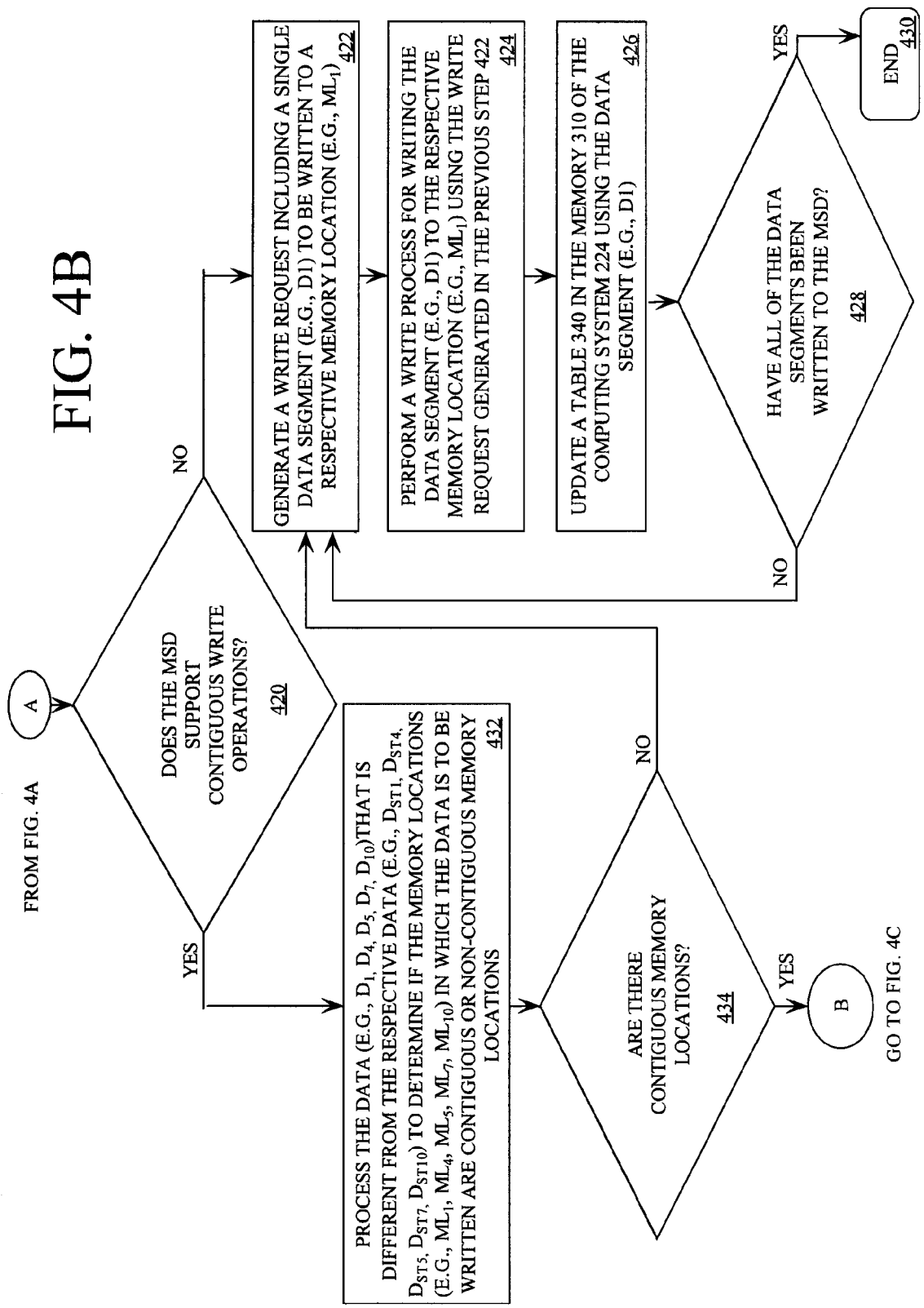

US 8,688,867 B2

SYSTEM AND METHODS FOR COMMUNICATING BETWEEN SERIAL COMMUNICATIONS PROTOCOL ENABLED DEVICES

FIELD OF THE INVENTION

The invention concerns control systems and methods for optimizing communications between serial communications protocol enabled devices.

BACKGROUND

There are many types of serial communications protocols known in the art. One such communications protocol is MODBUS. MODBUS is a serial communications protocol first published in 1979 for use with its programmable logic controllers (PLCs). It has become a de facto standard communications protocol in industry, and is now the most commonly available means of connecting industrial electronic devices. More particularly, the MOSBUS protocol is often used for sending information between a client and server of a MODBUS enabled system. There are many types of MODBUS enabled systems known in the art, such as the MODBUS enabled system 100 shown in FIG. 1A.

System 100 is configured for controlling industrial equipment and processes. The system 100 is typically comprised of a first industrial control system (FICS) 102, a gateway node 120, a second industrial control system (SICS) 122, and industrial equipment 118, 126. The FICS and SICS 102, 122 can have a distributed network configuration, i.e., there are application specific modules connected to each other, industrial equipment 118, 126, and operator interfaces via a local control network. The gateway node 120 is configured to enable communications between the FICS 102 and SICS 122.

As shown in FIG. 1A, the FICS 102 generally includes a serial bus 104 having a particular data transfer rate (e.g. 9,600 bits per second (BPS)) and MODBUS server devices 106, 108, 110, 112 connected to and accessible by other portions of the system 100 through the serial bus 104. Each of the MODBUS server devices 106, 108, 110, 112 is comprised of a memory device 130, 132, 134, 136 including respective storage locations $140_1, \ldots, 140_N, 142_1, \ldots, 142_N, 144_1, \ldots, 144_N, 146_1, \ldots, 146_N$. Each of the memory devices 130, 132, 134, 136 has process parameter information stored therein. Such process parameter information generally includes, but is not limited to, information defining temperature parameters, timing parameters, and liquid level parameters.

SICS 122 is comprised of a computing system (or MODBUS client device) 124. The computing system 124 is typically a desktop personal computer system, a laptop personal computer system, a personal digital assistant, a wireless computing device, or any other general purpose computer processing device. The computing system 124 is configured to allow users to monitor and/or control an industrial process or equipment 126. More particularly, the computing system 124 is configured to enable a user to write parameter information to and/or read parameter information from each of the MODBUS server devices 106, 108, 110, 112.

A typical write process is shown in FIG. 1B performed by the MODBUS enabled system 100 of FIG. 1A. The write process generally involves generating a write request at the computing device 124 and sending the write request from the computing device 124 to the gateway node 120. The write request comprises data to be written to one or all of the memory locations of the MODBUS server device. Upon receipt of the write request, the gateway node 120 transitions out of an IDLE state, generates a write request message and sends the write request message to a MODBUS server device (e.g., MODBUS server device 108). The phrase "IDLE state" as used herein refers to a condition that exists whenever there are no outstanding write/read requests and transaction resources are immediately available for use. The write request message includes an entire data block (i.e., N bits or bytes) or a portion of a data block (i.e., a single bit or byte). After receiving the write request message the MODBUS server device performs write operation for writing data to one or all of the memory locations (e.g., $142_1, \ldots, 142_N$) in the MODBUS server device. The MODBUS server device also generates a response message and communicates the same to the gateway node 120. The gateway node 120 forwards the response message to the computing device 124. Thereafter, the gateway node 120 transitions into its IDLE state so that transaction resources are freed.

A typical read process is shown in FIG. 1C performed by the MODBUS enabled system 100 of FIG. 1A. The read process generally involves generating a reading query at the computing device 124 and sending the reading query from the computing device 124 to the gateway node 120. Upon receipt of the reading query, the gateway node 120 transitions out of an IDLE state, generates a read request message, and sends the read request message to a MODBUS server device (e.g., MODBUS server device 108). After receiving the read request, the MODBUS server device performs read operations, generates a response message, and communicates the response message to the gateway node 120. The gateway node 120 forwards the response message to the computing device 124. The response message includes an entire data block (i.e., N bits or N bytes). Thereafter, the gateway node 120 transitions into its IDLE state so that transaction resources are freed.

Despite the advantages of conventional MODBUS enabled system 100, system 100 suffers from certain drawbacks. For example, the communications between the serial MODBUS devices 124, 120, 106, 108, 110, 112 are restricted by the bandwidth of the serial bus 104, which is typically 9,600 bps. In addition, the read/write processes are restricted to a single read or write request at any given time. Accordingly, the rate of transferring data to the serial MODBUS devices 124, 120, 106, 108, 110, 112 is severely limited. As such, there is a need for an improved serial communication protocol (SCP) enabled system capable of transferring data to the SCP devices at a higher rate as compared to conventional SCP enabled systems.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods and implementing systems for optimizing communications between a first and second serial communications protocol (SCP) enabled device. Embodiments of the method include the step of comparing a data block comprising a plurality of data values from the first SCP enabled device to a plurality of reference data values. The method also includes the step of determining which of the data values has changed and which of the data values has not changed. This determination is made based on the comparing step. The method further involves writing substantially only the data values that have changed to a memory of the second SCP enabled device. As used herein, the phrase "writing substantially only the data values that have changed" refers to excluding at least eighty percent (80%) of data values that have not changed, such as greater than ninety percent (>90%), less than ninety five percent (95%), or in other embodiments all data values that have not changed. According to embodiments of the invention, the SCP enabled device comprises a MODBUS device.

BRIEF DESCRIPTION OF THE DRAWINGS

Embodiments will be described with reference to the following drawing figures, in which like numerals represent like items throughout the figures, and in which:

FIGS. 4A-4C collectively provide a flow diagram of method for generating write requests at the computing system shown in FIGS. 2-3.

DETAILED DESCRIPTION

Figure 1A:
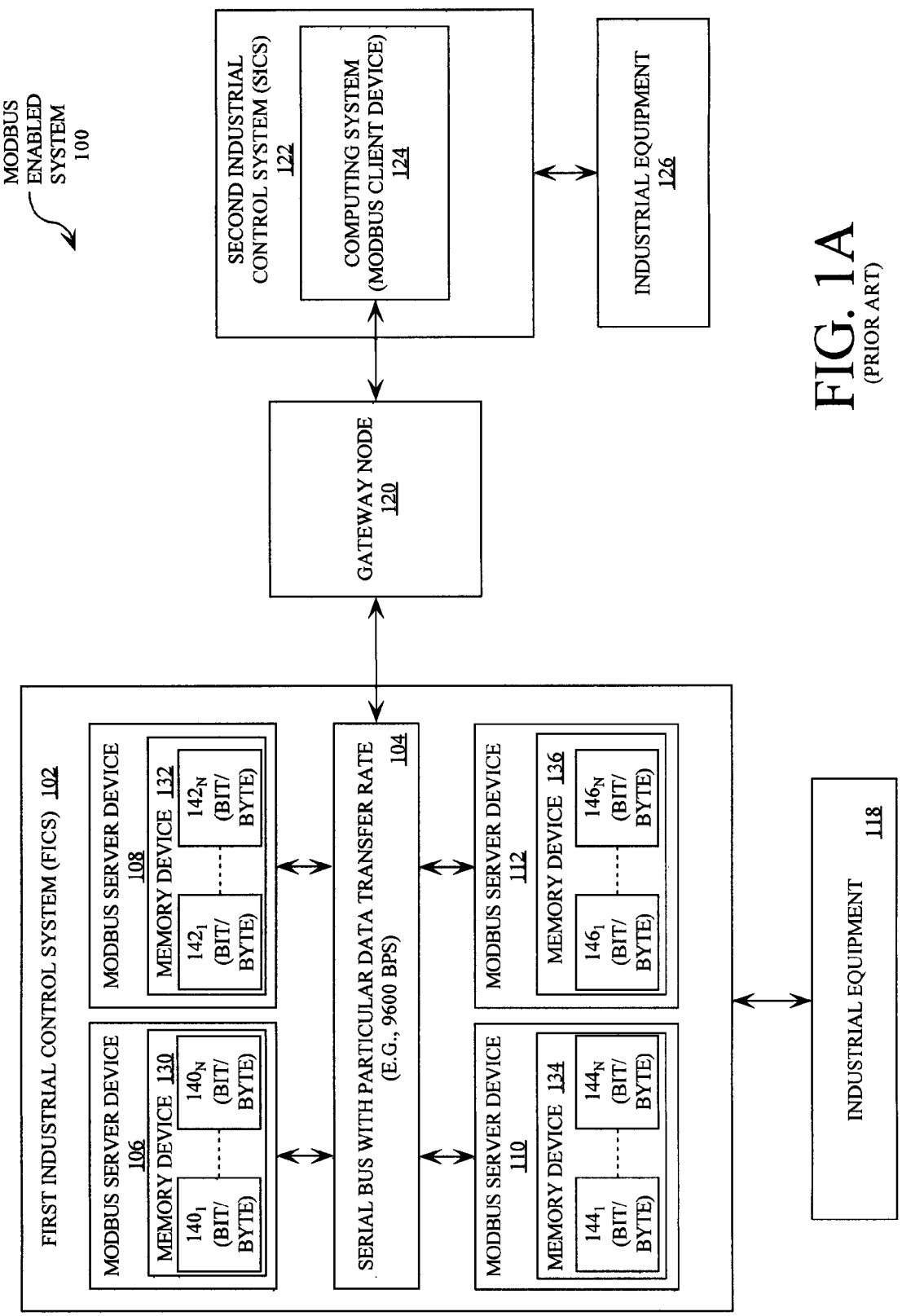
FIG. 1A is a block diagram of a conventional MODBUS enabled system.
Figure 1B:
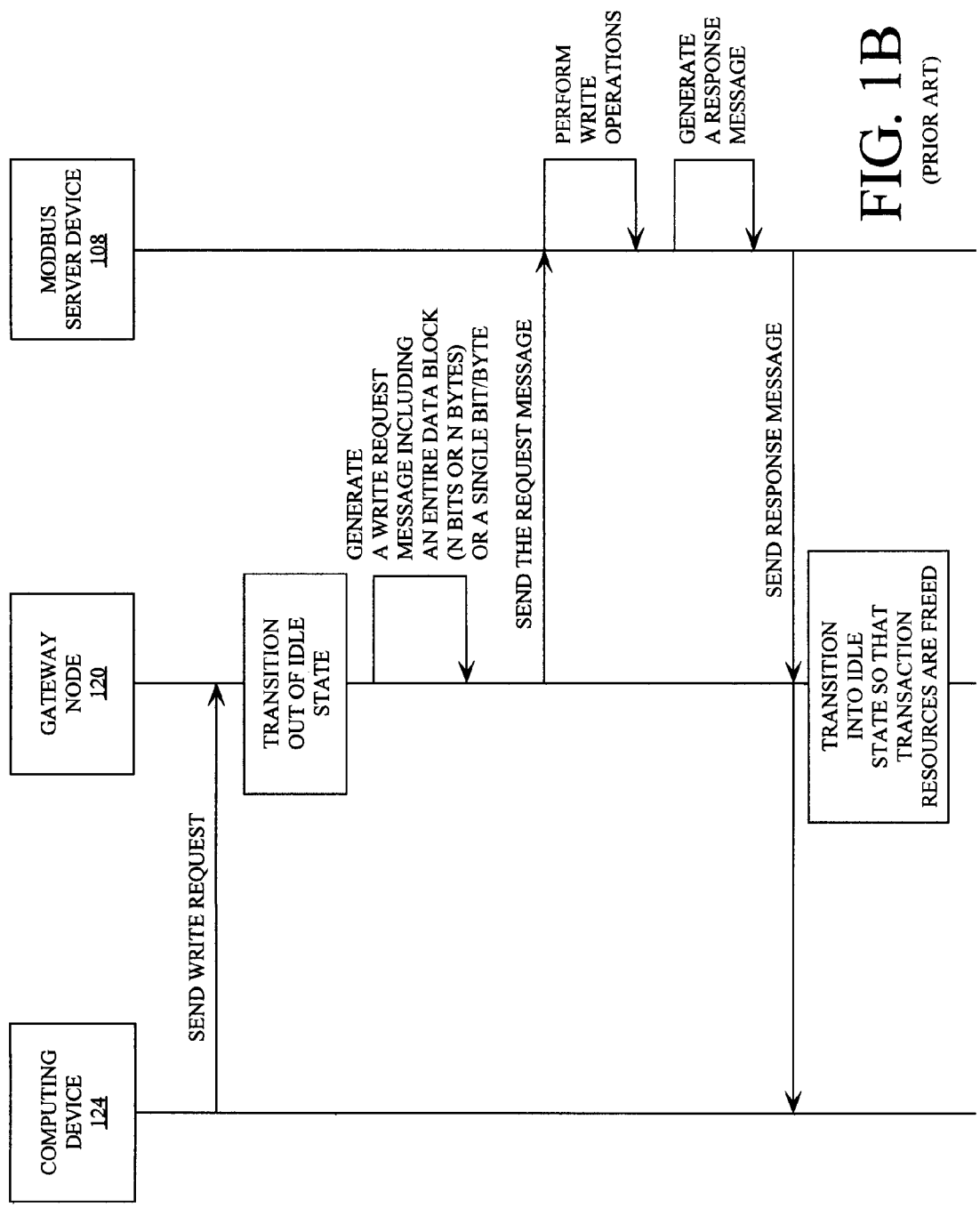
FIG. 1B is a sequence diagram of a conventional write process performed by the MODBUS enabled system of FIG. 1A.
Figure 1C:
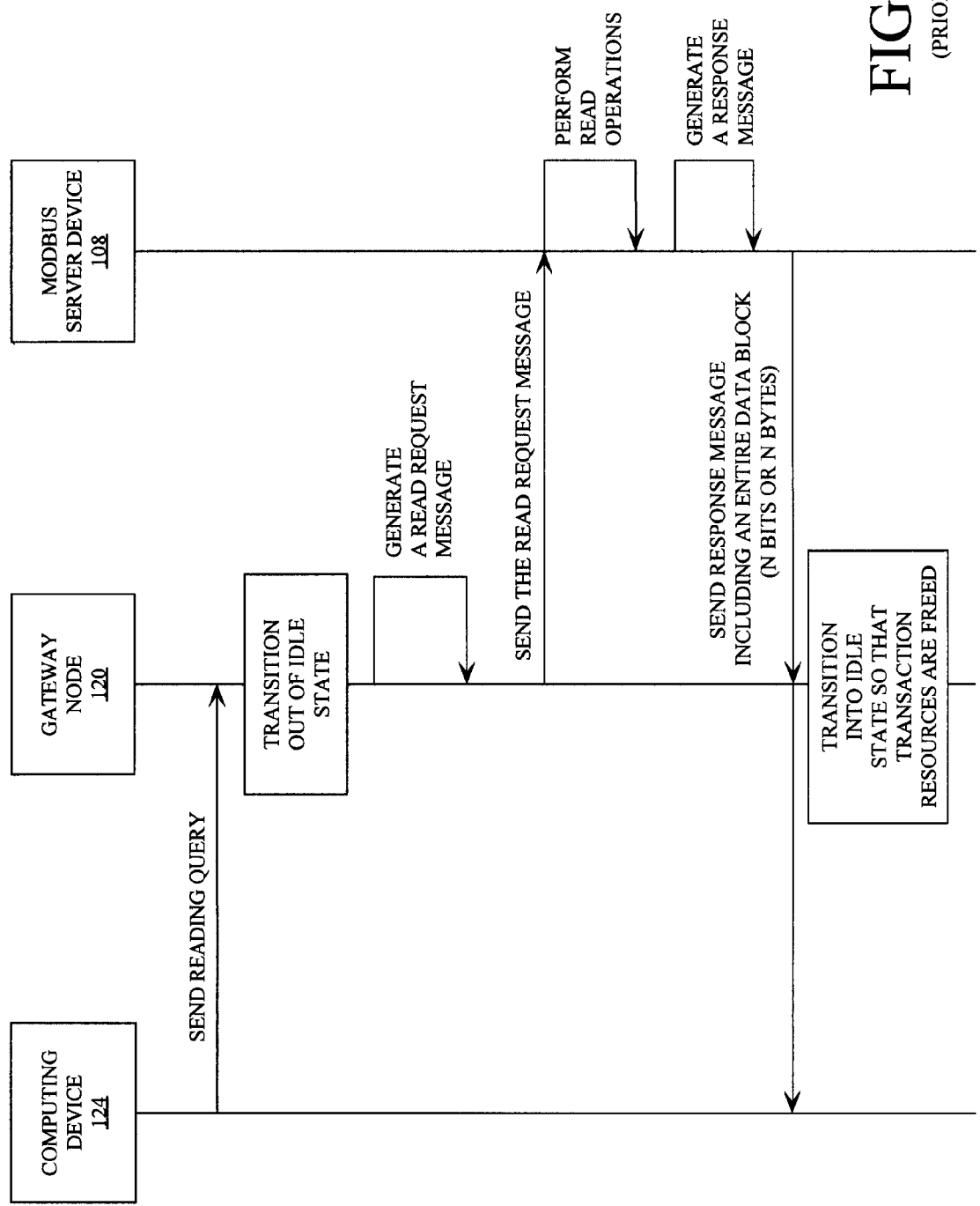
FIG. 1C is a sequence diagram of a conventional read process performed by the MODBUS enabled system of FIG. 1A.

Embodiments of the invention provide methods and related implementing systems for optimizing communications between serial communications protocol (SCP) enabled devices. Notably, such methods reduce the number of write transactions between SCP enabled devices as compared to conventional SCP enabled systems, such as system 100 described above in relation to FIGS. 1A-1C. In this regard, such methods reduce the number of write transactions by selectively eliminating unnecessary writes operations. More particularly, methods according to embodiments of the invention generally involve disregarding data segments that are different from data segments previously written to or read from respective memory locations within an SCP enabled device. Such methods also generally reduce the number of single write transactions between SCP enabled devices by generating write requests including data segments to be written to a set of contiguous memory locations within an SCP enabled device. The phrase "contiguous memory locations" as used herein refers to two or more sequentially ordered memory locations (e.g., $ML_1$, $ML_2$, $ML_3$, ..., $ML_N$). In contrast, the phrase "non-contiguous memory locations" as used herein refers to two or more non-sequentially ordered memory locations (e.g., $ML_1$, $ML_5$, $ML_7$).

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the invention can be utilized. In this regard, it should be understood that the methods of the present invention can be utilized in any application where fast, efficient communications between SCP (e.g. MODBUS) enabled devices are required. Such applications include, but are not limited to, industrial plant control applications and customized network applications. Accordingly, the methods of the present invention will now be described in relation to one such application, namely, the industrial plant control application.

Figure 2:
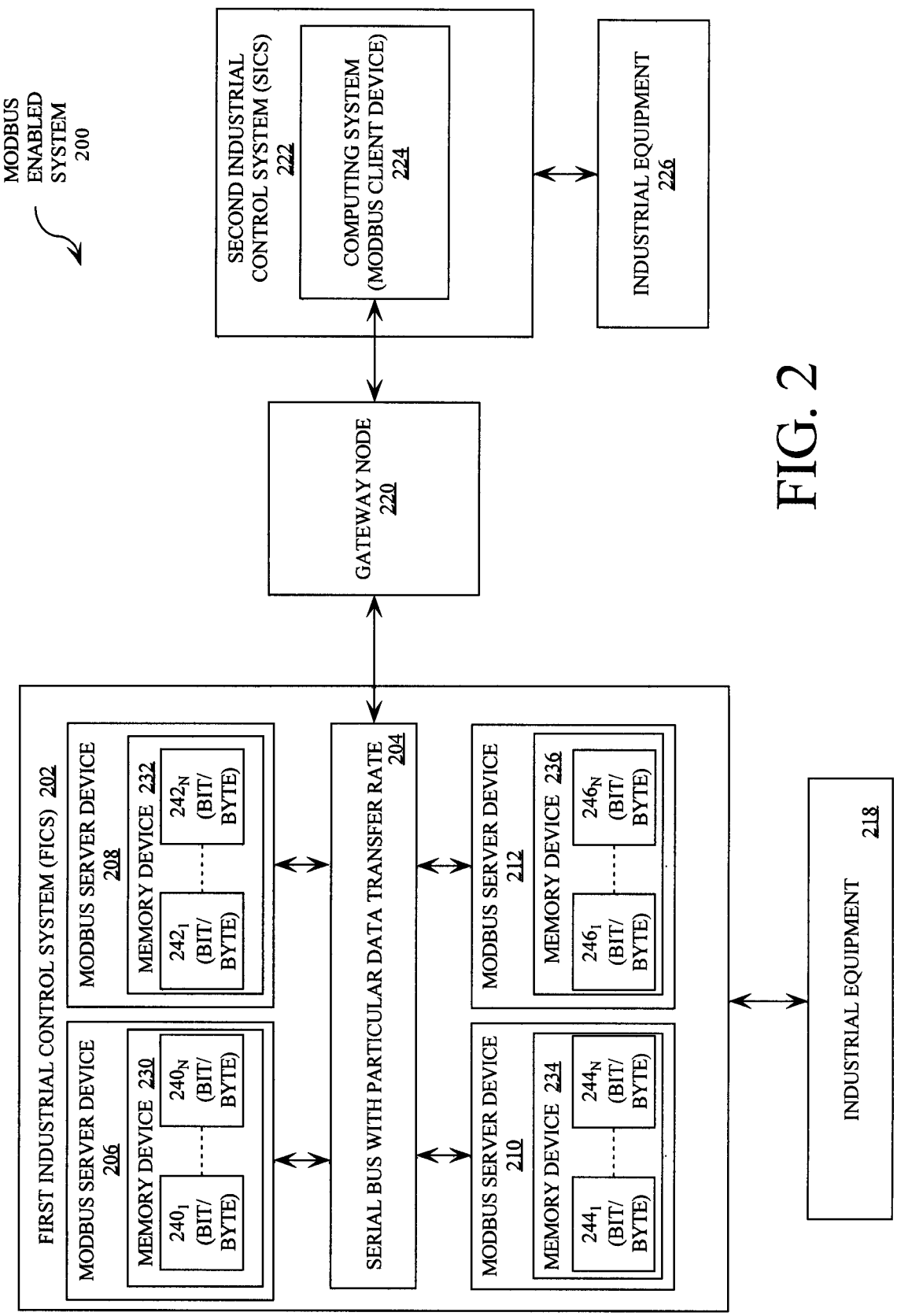
FIG. 2 is a block diagram of a MODBUS enabled system according to an embodiment of the invention.

Referring now to FIG. 2, there is provided a block diagram of a MODBUS enabled system 200 according to an embodiment of the present invention. However, it should be understood that the invention is not limited in this regard. For example, the system can be any SCP enabled system selected in accordance with a particular application. As shown in FIG. 2, the MODBUS enabled system 200 is comprised of a first industrial control system (FICS) 202, a gateway node 220, a second industrial control system (SICS) 222, and industrial equipment 218, 226. Gateway nodes are well known to those having ordinary skill in the art, and therefore will not be described herein. However, it should be understood that the gateway node 220 is configured to enable communications between the FICS 202 and SICS 222.

The FICS 202 is configured to enable a user (not shown) to monitor and/or control the industrial equipment 218. Similarly, the SICS 222 is configured to enable a user (not shown) to monitor and/or control the industrial equipment 226. In one non-limiting application, each of the systems 202, 222 can be distributed control systems, i.e., there are application specific modules (not shown) connected to each other, industrial equipment 218, 226 and operator interfaces (not shown) via a local control network (not shown). The industrial equipment 218, 226 may include, but is not limited to, gauges, valves, transmitters, actuators, and sensors. The invention is not limited in this regard.

As shown in FIG. 2, the FICS 202 is comprised of a serial bus 204 and MODBUS server devices 206, 208, 210, 212 connected to and accessible by other portions of the system 200 through the serial bus 204. Each of the MODBUS server devices 206, 208, 210, 212 is comprised of a memory device 230, 232, 234, 236. Each of the memory devices 230, 232, 234, 236 has process parameter information stored therein. Such process parameter information generally includes, but is not limited to, information defining temperature parameters, timing parameters, and liquid level parameters.

Each memory device 230, 232, 234, 236 is configured to store an entire data block comprising N data segments. Each of the N data segments can comprise any number of bits or bytes selected in accordance with a particular memory device application. For example, each data segment is comprised of one (1) bit of data or one (1) byte of data. In this regard, it should be understood that each memory device 230, 232, 234, 236 can include a plurality of memory locations $240_1$, ..., $240_N$, $242_1$, ..., $242_N$, $244_1$, ..., $244_N$, $246_1$, ..., $246_N$, respectively. If the memory devices 230, 232, 234, 236 are random access memory (RAMs) devices, then each register (or memory location $240_1$, ..., $240_N$, $242_1$, ..., $242_N$, $244_1$, ..., $244_N$, $246_1$, ..., $246_N$) is configured to store one (1) byte of data. Alternatively, the memory devices 230, 232, 234, 236 can be comprised of coils configured to store one (1) bit of data. The invention is not limited in this regard.

It should be noted that each of the MODBUS server devices 206, 208, 210, 212 is configured to support at least one type of write operation. A first type of write operation can involve writing a single data segment to a given memory location. A second type of write operation can involve writing two or more contiguous data segments to given respective memory locations. A third type of write operation can involve writing an entire data block to a particular memory device 230, 232, 234, 236.

If a MODBUS server device 206, 208, 210, 212 supports the first type of write operation, then all write operations can be performed using a single write command for writing a single non-contiguous data segment to a particular memory location. If a MODBUS server device 206, 208, 210, 212 supports the second type of write operation, then the write operations can be performed using a multiple write command for writing two or more contiguous data segments to particular memory locations within a memory device, respectively. However, if a MODBUS server device 206, 208, 210, 212 supports the first and second types of write operations, then the write operations can be performed using a single or multiple command selected in accordance with a particular write application. If the MODBUS server device 206, 208, 210, 212 supports the third type of write operation, then a write operation can be performed using a single command for writing an entire data block to a particular memory device 230, 232, 234, 236.

Figure 3:
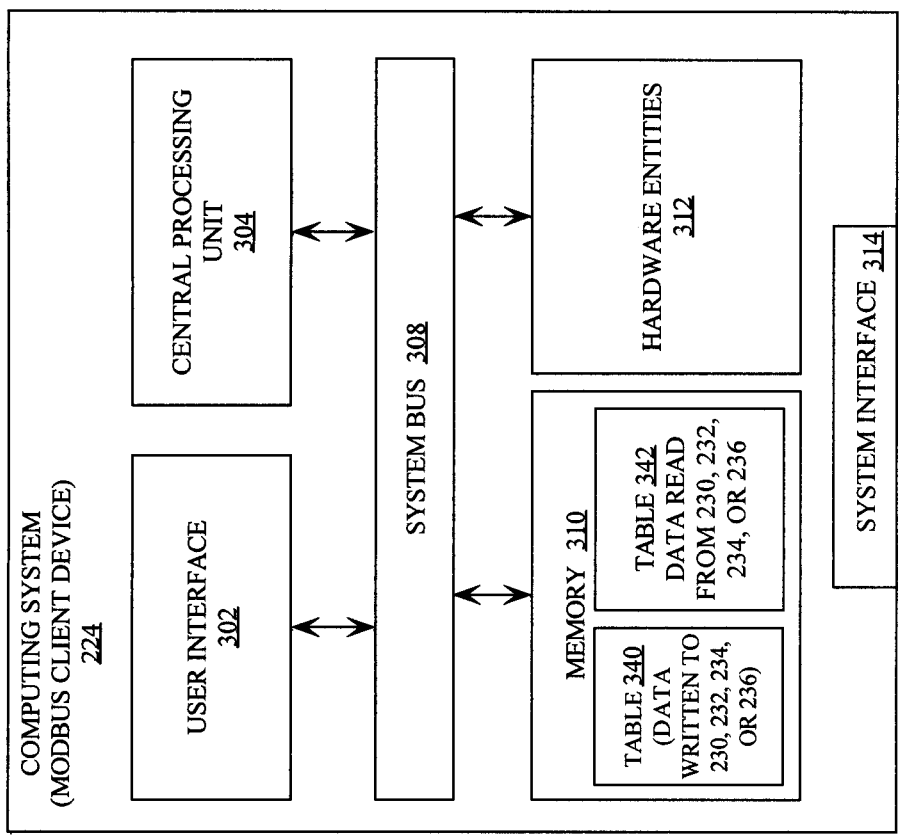
FIG. 3 is a more detailed block diagram of the computing system (or MODBUS client device) shown in FIG. 2.

Referring again to FIG. 2, SICS 222 is comprised of a computing system (or a MODBUS client device) 224. A more detailed block diagram of the computing system 224 is provided in FIG. 3. Referring now to FIG. 3, the computing system 224 may be a desktop personal computer system, a laptop personal computer system, a personal digital assistant, a mobile computing device, or any other general purpose computer processing device. Accordingly, the computing system 224 is comprised of a user interface 302 including input devices, output devices, and software routines configured to allow a user (not shown) to interact with and control software applications installed on the computing system 224. Such input and output devices include, but are not limited to, a display screen (not shown), a speaker (not shown), a keypad (not shown), a directional pad (not shown), a directional knob (not shown), and a microphone (not shown). As such, the computing system 224 can facilitate a user-software interaction for communicating with the FICS 202 (via the gateway node 220) for reading data from or writing data to the MODBUS server devices 206, 208, 210, 212.

As shown in FIG. 3, the computing system 224 can be comprised of a system interface 314, a central processing unit 304, a system bus 308, memory 310 connected to and accessible by other portions of the computing system 224 through the system bus 308, and hardware entities 312 connected to the system bus 308. At least some of the hardware entities 312 perform actions involving access to and use of the memory 310, which may be a random access memory (RAM), a disk driver, and/or a compact disc read only memory (CD-ROM). More particularly, the hardware entities 312 may include a microprocessor programmed for accessing the memory device 310, retrieving data from tables 340, 342 stored in the memory device 310, and storing data in the tables 340, 342 of the memory device 310. Table 340 can include copies of data written to the MODBUS server devices 206, 208, 210, 212 (described above in relation to FIG. 2). Table 342 can include copies of data blocks read from the MODBUS server devices 206, 208, 210, 212.

The hardware entities 312 may also include microprocessors, application specific integrated circuits (ASICs), and other hardware. The hardware entities 312 may include a microprocessor programmed for communicating with a gateway node 220. More particularly, the hardware entities 312 may include a microprocessor programmed for generating a write request for writing data to a MODBUS server device 206, 208, 210, 212, communicating the write request to the gateway node 220, and receiving a response message from the gateway node 220. A method for generating the write request according to an embodiment of the invention will be described below in relation to FIGS. 4A-4C. Similarly, the microprocessor can be programmed for generating a reading query and communicating the reading query to the gateway node 220.

Referring again to FIG. 3, the system interface 314 allows the computing system 224 to communicate directly with the gateway node 220. However, the invention is not limited in this regard. For example, the system interface 314 can alternatively allow the computing system 224 to communicate indirectly with the gateway node 220. In such a scenario, the computing system 224 communicates with the gateway node 220 through a network (not shown). The network (not shown) can be a wireless network such as a local area network, a wide area network, or a personal area network.

Figure 4C:
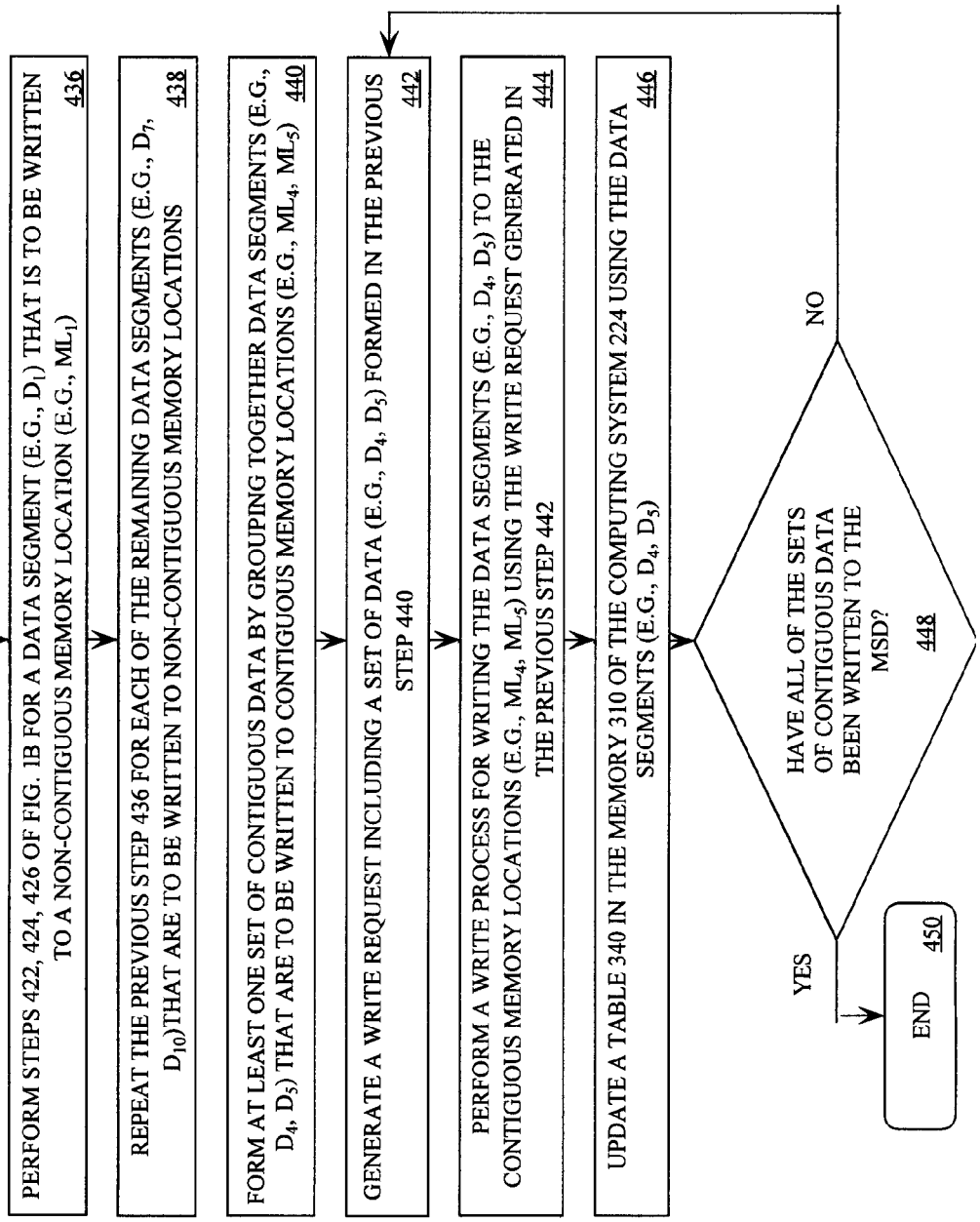

The following FIGS. 4A-4C and accompanying text illustrate a method 400 for generating a write request at the computing system 224 according to an embodiment of the invention. It should be appreciated, however, that the method disclosed herein is provided for purposes of illustration only and that the present invention is not limited solely to the method shown. As will be described below, method 400 reduces the number of write transactions between MODBUS enabled devices 206, . . . , 212, 220, 222 as compared to conventional MODBUS enabled systems, such as system 100 described above in relation to FIGS. 1A-1C.

Method 400 can reduce the number of write transactions between MODBUS enabled devices 206, . . . , 212, 220, 222 by selectively eliminating unnecessary writes operations. More particularly, the method 400 can include disregarding data segments that are not different from data segments previously written to or read from respective memory locations within a MODBUS server device 206, . . . , 212. Method 400 can also reduce the number of single write transactions between MODBUS enabled devices 206, . . . , 220, 222 by generating write requests including data segments to be written to a set of contiguous memory locations within a MODBUS server device 206, . . . , 212.

Referring now to FIGS. 4A-4C, the method 400 begins at step 402 and continues with step 404. In step 404, a plurality of data segments $D_1, D_3, D_4, D_5, D_7, D_{10}$ are received at the computing system 224. Each of the data segments $D_1, D_3, D_4, D_5, D_7, D_{10}$ is to be written to a MODBUS server device (e.g., devices 206, 208, 210, 212). After receiving the data segments, step 406 is performed. In step 406, the memory locations $ML_1, ML_3, ML_4, ML_5, ML_7, ML_{10}$ of the MODBUS server device are identified. The memory locations $ML_1, ML_3, ML_4, ML_5, ML_7, ML_{10}$ are locations in which the data segments $D_1, D_3, D_4, D_5, D_7, D_{10}$ are to be written, respectively. Subsequent to step 406, the method 400 continues with step 408.

In step 408, data representative of stored data segments $D_{ST1}, D_{ST3}, D_{ST4}, D_{ST5}, D_{ST7}, D_{ST10}$ is obtained from the memory 310 of the computing system 224. Each of the data segments $D_{ST1}, D_{ST3}, D_{ST4}, D_{ST5}, D_{ST7}, D_{ST10}$ is a data segment that was last written to or read from memory locations $ML_1, ML_3, ML_4, ML_5, ML_7, ML_{10}$ of the MODBUS server device. Thereafter, the method 400 continues with a decision step 410. If all the data representative of stored data segments indicates that the data segments are substantially the same as the respective stored data segments [410:NO], these segments are considered duplicated segments in step 412, all data segments received in step 404 are disregarded. Subsequently, step 414 is performed where the method 400 returns to step 402.

Alternatively, if at least one data segment (e.g., $D_1$, $D_4$, $D_5$) is different from a respective stored data segment (e.g., $D_{ST1}$, $D_{ST4}$, $D_{ST5}$) [410:YES], then the method 400 continues with step 416. In step 416, any duplicated data segments are disregarded. As described above, the duplicated data segments are data segments (e.g., $D_3$) that are substantially the same as the respective stored data segments (e.g., $D_{ST3}$). Thereafter, the method 400 continues with step 418. In step 418, the computing system 224 communicates with the MODBUS server device to determine which type of write operation it supports. For example, whether the MODBUS server device can support a first, and/or second type of write operation. The first type of write operation can involve writing a single data segment to a given memory location. The second type of write operation can involve writing two or more data segments to particular contiguous memory locations. Subsequent to the completion of step 418, the method 400 continues with a decision step 420 of FIG. 4B.

If the MODBUS server device does not support the second type of write operations (i.e., contiguous write operations) [420:NO], then step 422 is performed. In step 422, a write request message is generated. The write request message includes a single data segment (e.g., $D_1$) to be written to a respective memory location (e.g., $ML_1$). Thereafter, the method 400 continues with step 424. In step 424, a write process is performed for writing the data segment (e.g., $D_1$) to the respective memory location (e.g., $ML_1$) using the write request message generated in the previous step 422. The write process will be described below in relation to FIG. 5. Subsequent to step 424, step 426 is performed where the table 340 of the computing system 224 is updated. Step 426 can involve storing a copy of the data segment (e.g., $D_1$) in table 340 of the memory 310 of the computing system 224. After updating the table 340, the method 400 continues with a decision step 428. If all of the data segments have been written to the MODBUS server device [428:YES], then the method 400 ends. Alternatively, if the data segments have been written to the MODBUS server device [428:NO], then the method 400 returns to step 422.

If the MODBUS server device supports the second type of write operations (i.e., contiguous write operations) [420:YES], then step 432 is performed. In step 432, data is processed to determine if the memory locations (e.g. $ML_1$, $ML_4$, $ML_5$, $ML_7$, $ML_{10}$) in which the data is to be written are contiguous memory locations (e.g. $ML_4$, $ML_5$) or non-contiguous memory locations (e.g. $ML_1$, $ML_7$, $ML_{10}$). The data includes the data segments (e.g., $D_1$, $D_4$, $D_5$, $D_7$, $D_{10}$) that are different from the respective stored data segments (e.g., $D_{ST1}$, $D_{ST4}$, $D_{ST5}$, $D_{ST7}$, $D_{ST10}$). After completing step 432, the method 400 continues with a decision step 434. If there aren't contiguous memory locations [434:YES], then step 422 is performed. If there are contiguous memory locations [434:YES], then the method 400 continues with a step 436 of FIG. 4C.

In step 436, steps 422, 424, and 426 of FIG. 4B are performed for a data segment (e.g., $D_1$) that is to be written to a non-contiguous memory location (e.g. $ML_1$). Subsequently, step 438 is performed where step 436 is repeated for each of the remaining data segments (e.g., $D_7$, $D_{10}$) that are to be written to non-contiguous memory locations (e.g., $ML_7$, $ML_{10}$). After step 438, step 440 is performed where at least one set of contiguous data is formed. Step 440 can involve grouping together data segments (e.g., $D_4$, $D_5$) that are to be written to contiguous memory locations (e.g., $ML_4$, $ML_5$).

After forming at least one set of contiguous data, step 442 is performed where a write request message is generated. The write request message includes a set of contiguous data (e.g. $D_4$, $D_5$) formed in the previous step 440. Thereafter, a write process is performed for writing the contiguous data (e.g. $D_4$, $D_5$) to the contiguous memory locations (e.g., $ML_4$, $ML_5$). The write process is described below in relation to FIG. 5. Step 444 can involve using the write request generated in the previous step 442. Subsequent to step 444, the table 430 of the computing system 224 is updated. Step 444 can generally involve storing a copy of the data segments (e.g. $D_4$, $D_5$) and memory locations (e.g., $ML_4$, $ML_5$) in memory 310 according to a table 430 format.

Subsequent to updating the table 430, the method 400 continues with a decision step 448. If all of the sets of contiguous data have not been written to the MODBUS server device [448:NO], then method 400 returns to step 442. If all of the sets of contiguous data have been written to the MODBUS server device [448:YES], then step 450 is performed where method 400 ends.

Figure 5:
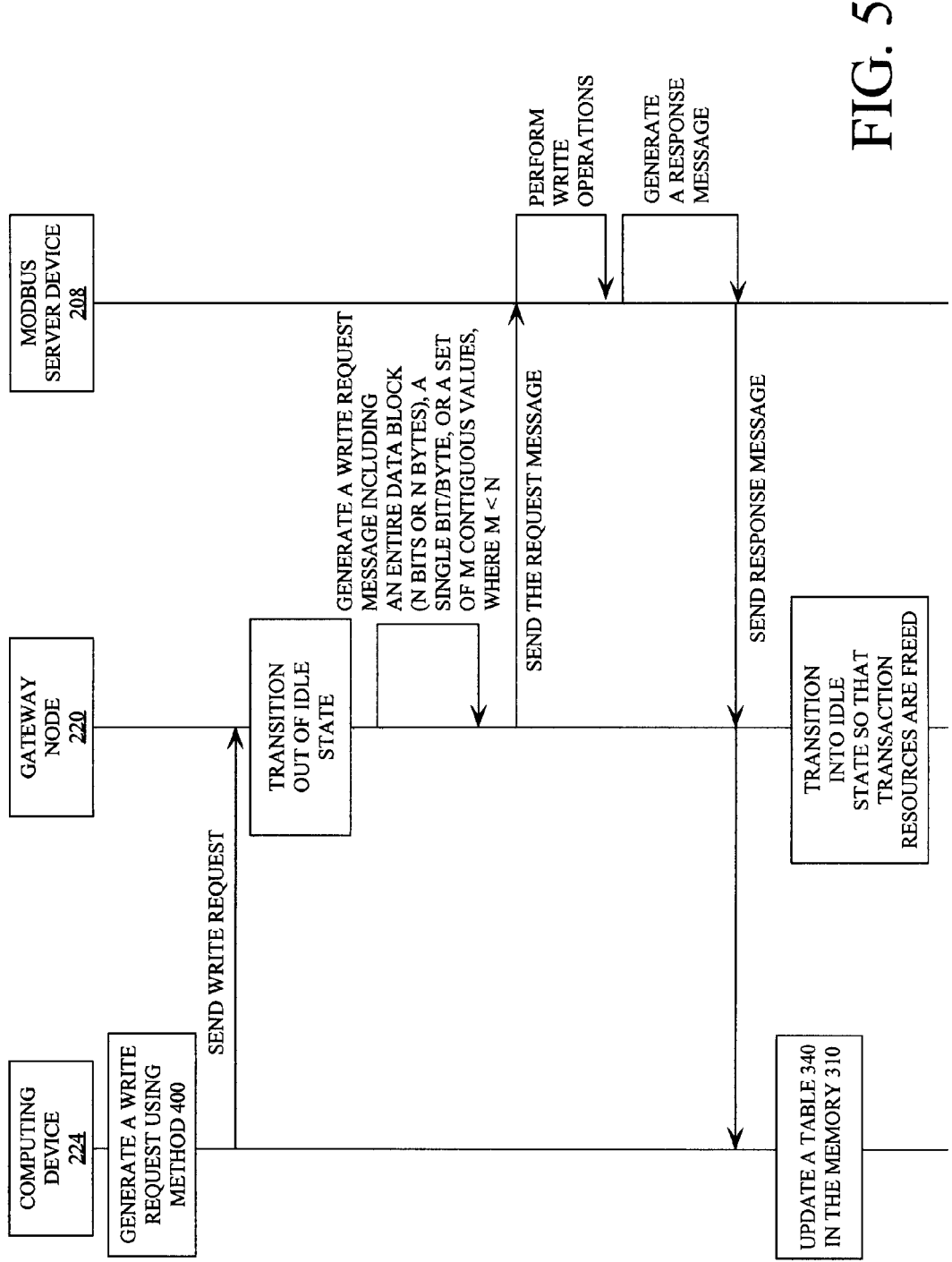
FIG. 5 is a sequence diagram of a write process performed by the MODBUS enabled system of FIG. 2.

Referring to FIG. 5, there is provided a sequence diagram of a write process performed by the MODBUS enabled system 200 of FIG. 2, according to an embodiment of the invention. As shown in FIG. 5, the write process can generally involve generating a write request at the computing device 224 using method 400 described above in relation to FIGS. 4A-4C. The write process also involves sending the write request from the computing device 224 to the gateway node 220. Upon receipt of the write request, the gateway node 220 transitions out of an IDLE state, generates a write request message, and sends the write request message to a MODBUS server device (e.g., MODBUS server device 208). As stated above, the phrase "IDLE state" as used herein refers to a condition that exists whenever there are no outstanding write/read requests and transaction resources are immediately available for use. The write request message can include an entire data block (i.e., N bits or bytes), a single data segment of the data block, or a set of M contiguous data segments of the data block. It should be understood that M is less than N. After receiving the write request message the MODBUS server device performs write operations for writing data to a non-contiguous memory location or contiguous memory locations in the MODBUS server device. The MODBUS server device also generates a response message and communicates the same to the gateway node 220. Upon receipt of the response message, the gateway node 220 forwards the same to the computing device 224. Thereafter, the gateway node 220 transitions into its IDLE state so that transaction resources are freed. Also, the computing device 224 updates the table 340 stored within its internal memory 310.

It should be noted that the above described writing operation according to an embodiment of the invention is different from conventional write operations, such as the write operation described above in relation to FIG. 1B. For example, the write operation of FIG. 5 involves (a) generating a write request using the method 400 described above in relation to FIGS. 4A-C, (b) generating a write request message including a set of M contiguous data segments, and (c) tracking the stored data by storing copies of the same in a table 340 of a memory internal to the computing system 224.

Figure 6:
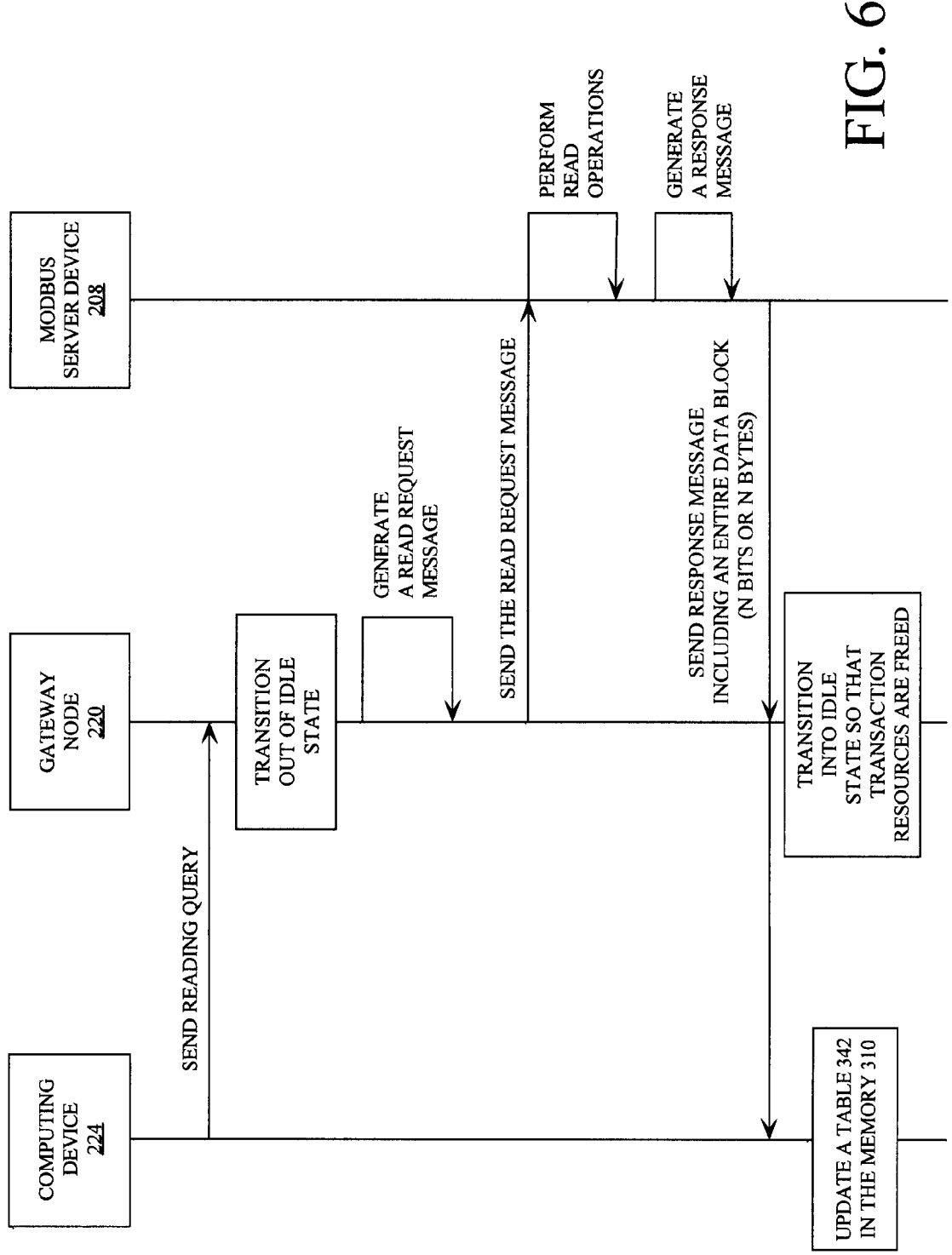
FIG. 6 is a sequence diagram of a read process performed by the MODBUS enabled system of FIG. 2.

Referring now to FIG. 6, there is provided a sequence diagram of a read process performed by a MODBUS enabled system according to an embodiment of the invention. The read process can generally involve generating a reading query at the computing device 224 and sending the reading query from the computing device 224 to the gateway node 220. Upon receipt of the reading query, the gateway node 220 transitions out of an IDLE state, generates a read request message, and sends the read request message to a MODBUS server device (e.g., MODBUS server device 208). After receiving the read request, the MODBUS server device performs read operations, generates a response message, and communicates the response message to the gateway node 220. The response message includes an entire data block (i.e., N bits or N bytes). Upon receipt of the response message, the gateway node 220 forwards the same to the computing device 224. Thereafter, the gateway node 220 transitions into its IDLE state so that transaction resources are freed. Also, the computing device 224 updates table 342 stored within its internal memory 310. In this regard, it should be understood that the process for updating table 342 can involve storing each data segment (e.g. $D_1, \ldots, D_N$) and associated memory locations (e.g., $ML_1, \ldots, ML_N$) in memory 310 according to a table 342 format.

It should be noted that the above described read operation is different from conventional read operations, such as the read operation described above in relation to FIG. 1C. For example, the read operation of FIG. 6 involves tracking the data block read from MODBUS server devices by storing copies of the same in a table 342 of a memory internal to the computing system 224.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for communicating between a first and a second serial communications protocol (SCP) enabled device, comprising the steps of:
   receiving a data block comprising a plurality of data values obtained from industrial equipment controlled by said second SCP enabled device;
   said second SCP enabled device comparing said plurality of data values to a plurality of reference data values stored by a memory of said second SCP enabled device which comprise copies of data values obtained from said industrial equipment previously written by said second SCP enabled device to a memory of said first SCP enabled device;
   based on said comparing step, said second SCP enabled device determining which of said plurality of data values have changed and which of said plurality of data values have not changed;
   forming at least one set of contiguous data by grouping together substantially said data values that have changed;
   determining that target memory locations in said memory of the first SCP enabled device are contiguous memory locations, and
   said second SCP enabled device writing substantially only said data values that have changed over a serial bus to said target memory locations of said memory of said first SCP enabled device,
   wherein said SCP is MODBUS, wherein said second SCP enabled device is a client device, and wherein said first SCP enabled device is a server device.

2. The method according to claim 1, wherein a gateway node is between said second SCP enabled device and said serial bus.

3. The method according to claim 1, wherein said reference data values further comprise copies of data values obtained from said industrial equipment that were previously read from said memory of said first SCP enabled device.

4. The method according to claim 1, further comprising:
   requesting confirmation from said first SCP enabled device that it supports contiguous write operations, and
   receiving confirmation said first SCP enabled device that it supports contagious write operations.

5. The method according to claim 4, wherein the step of forming at least one set of contiguous data further comprises:
   forming at least one set of contiguous data by grouping together said data values that have changed and that are to be written to M contiguous target memory locations, wherein M is less than a number of memory locations N required to store a data block containing N data segments.

6. The method according to claim 5, further comprising the step of writing said at least one set of contiguous data to said M contiguous target memory locations.

7. The method according to claim 6, further comprising the step of said second SCP enabled device tracking data written to said first SCP enabled device by retaining said at least one set of contiguous data at said second SCP enabled device.

8. A control system, comprising:
   a first serial communications protocol (SCP) enabled device having a memory;

a second serial communications protocol (SCP) enabled device having a memory coupled to said first SCP enabled device by a serial bus, said second SCP enabled device configured for:

comparing a data block comprising a plurality of data values obtained from industrial equipment controlled by said second SCP enabled device to a plurality of reference data values, wherein said reference data values are stored at said second SCP enabled device and said comparing is performed by said second SCP enabled device;

based on said comparing step, determining which of said plurality of data values have changed and which of said plurality of data values have not changed, forming at least one set of contiguous data by grouping together substantially said data values that have changed;

determining that target memory locations in said memory of the first SCP enabled device are contiguous memory locations, and writing substantially only said data values that have changed over said serial bus to said target memory locations of said memory of said first SCP enabled device, wherein said SCP is MODBUS, wherein said second SCP enabled device is a client device, and wherein said first SCP enabled device is a server device.

9. The control system according to claim 8, further comprising a gateway node between said second SCP enabled device and said serial bus.

10. The control system according to claim 8, wherein said reference data values further comprise copies of data values obtained from said industrial equipment that were previously read from said memory of said first SCP enabled device.

11. The control system according to claim 8, further comprising:
 requesting confirmation from said first SCP enabled device that it supports contiguous write operations, and
 receiving confirmation from said first SCP enabled device that it supports contiguous write operations.

12. The control system according to claim 11, wherein said second SCP enabled device is further configured for forming at least one set of contiguous data by grouping together said data values that have changed and that are to be written to M contiguous target memory locations, wherein M is less than a number of memory locations N required to store a data block containing N data segments.

13. The control system according to claim 12, wherein said second SCP enabled device is further configured for writing said at least one set of contiguous data to said M contiguous target memory locations.

14. The control system according to claim 13, wherein said second SCP enabled device is further configured for tracking data written to said first SCP enabled device by retaining said at least one set of contiguous data at said second SCP enabled device.

* * * * *